US012621153B2

(12) United States Patent
Zilbershtein et al.

(10) Patent No.: US 12,621,153 B2
(45) Date of Patent: May 5, 2026

(54) METHODS, SYSTEMS, AND DEVICES FOR ASSOCIATION OF INTERNET-OF-THINGS (IoT) DEVICES TO ANONYMIZED HOUSEHOLDS

(71) Applicant: Synamedia Limited, Staines Upon Thames (GB)

(72) Inventors: Itai Ephraim Zilbershtein, Hod Hasharon (IL); Thomas Paul Burnley, Hampshire (GB)

(73) Assignee: SYNAMEDIA LIMITED, Maidenhead (GB)

( * ) Notice: Subject to any disclaimer, the term of this patent is extended or adjusted under 35 U.S.C. 154(b) by 221 days.

(21) Appl. No.: 18/243,335

(22) Filed: Sep. 7, 2023

(65) Prior Publication Data

US 2025/0088359 A1    Mar. 13, 2025

(51) Int. Cl.
*H04L 9/00* (2022.01)
*H04L 9/32* (2006.01)

(52) U.S. Cl.
CPC .......... *H04L 9/3213* (2013.01); *H04L 9/3239* (2013.01); *H04L 9/3297* (2013.01); *H04L 9/50* (2022.05)

(58) Field of Classification Search
CPC ... H04L 9/3213; H04L 9/3239; H04L 9/3297; H04L 9/50
See application file for complete search history.

(56) References Cited

U.S. PATENT DOCUMENTS

| | | | |
|---|---|---|---|
| 9,544,798 B1 * | 1/2017 | Ahmadzadeh ...... | H04L 63/1408 |
| 10,498,718 B2 * | 12/2019 | Singh ...................... | H04L 63/10 |
| 12,160,433 B1 * | 12/2024 | Krishnamoorthy ..... | H04L 43/16 |
| 2013/0235859 A1 * | 9/2013 | Sun ........................ | H04W 48/08 |
| | | | 370/338 |
| 2013/0279381 A1 * | 10/2013 | Sampath ............... | H04W 56/00 |
| | | | 370/336 |
| 2019/0082390 A1 * | 3/2019 | Azizi .................... | H04L 5/0007 |
| 2019/0223194 A1 * | 7/2019 | Arrobo Vidal ... | H04N 21/43637 |
| 2019/0268847 A1 * | 8/2019 | Asterjadhi ........ | H04W 52/0216 |
| 2019/0306166 A1 * | 10/2019 | Konda ................... | H04W 12/73 |
| 2020/0007621 A1 * | 1/2020 | Adams .................. | H04L 65/612 |
| 2020/0068486 A1 * | 2/2020 | Asterjadhi ........... | H04W 48/08 |
| 2020/0107197 A1 * | 4/2020 | Kaushik ............... | H04W 88/08 |
| 2021/0249145 A1 * | 8/2021 | Futamura ............. | H04L 9/3273 |
| 2022/0174755 A1 * | 6/2022 | Ergen ................... | H04W 12/71 |
| 2022/0182818 A1 * | 6/2022 | Williams .............. | H04W 12/61 |

* cited by examiner

*Primary Examiner* — Andrew Suh

(74) *Attorney, Agent, or Firm* — Fernando & Partners, LLP

(57) ABSTRACT

Techniques for enabling the association of client devices to anonymized households during an authorization process is performed at a server including processor(s) and non-transitory memory. The server receives a request for a service or content from a client device that specifies a device identifier, a first hash value approximating a unit in which the client device is deployed, and a second hash value representing a connection to the unit. The server records and evaluates the request based on the device identifier, the first hash value, and the second hash value so that an access token is generated for the client device and bound to the first hash value. The server sends the access token to the client device for access to the service or content via the connection to the unit upon validating the request or reports an anomaly determined based on the recorded data.

20 Claims, 7 Drawing Sheets

700

At a server including one or more processors and non-transitory memory ～710

Receive a request for a service from a client device, wherein the request includes a device identifier corresponding to the client device, a first hash value approximating a unit in which the client device is deployed, and a second hash value representing a connection to the unit ～720

Record and evaluate the request based on the device identifier, the first hash value, and the second hash value ～730

Generate an access token for the client device, bind the access token to the first hash value, and send the access token to the client device for access to the service or content via the connection to the unit upon validating the request ～740

Report an anomaly associated with one or more of the unit and the connection to the unit upon detecting the anomaly based on the device identifier, the first hash value, and the second hash value ～750

700

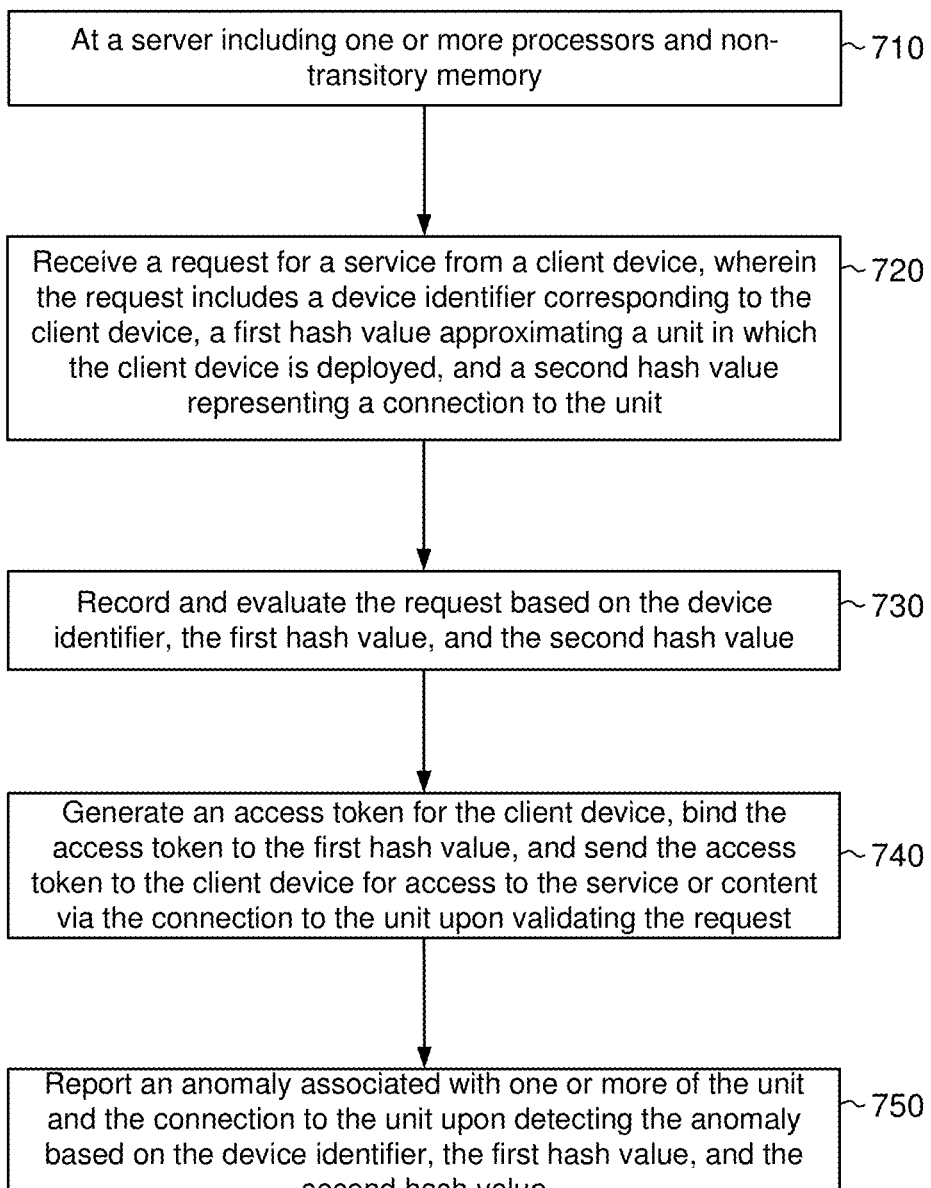

At a server including one or more processors and non-transitory memory ~710

Receive a request for a service from a client device, wherein the request includes a device identifier corresponding to the client device, a first hash value approximating a unit in which the client device is deployed, and a second hash value representing a connection to the unit ~720

Record and evaluate the request based on the device identifier, the first hash value, and the second hash value ~730

Generate an access token for the client device, bind the access token to the first hash value, and send the access token to the client device for access to the service or content via the connection to the unit upon validating the request ~740

Report an anomaly associated with one or more of the unit and the connection to the unit upon detecting the anomaly based on the device identifier, the first hash value, and the second hash value ~750

Figure 7

METHODS, SYSTEMS, AND DEVICES FOR ASSOCIATION OF INTERNET-OF-THINGS (IoT) DEVICES TO ANONYMIZED HOUSEHOLDS

TECHNICAL FIELD

The present disclosure relates generally to security and, more specifically, to methods, devices, and systems of tracking deployed Internet-of-Things (IoT) devices.

BACKGROUND

Many low-cost Internet of Things (IoT) devices are provided to end-users free of charge or without a managed subscription. Using these low-cost IoT devices, a high-level service provider can offer various high-level services, e.g., using an IoT service from an IoT vendor built on top of the distributed IoT devices to offer high-level over-the-top (OTT) video services. In many cases, IoT device(s) are self-installed by users, thus providing no information to the IoT vendor regarding the association of the IoT device(s) with a particular high-level service account (e.g., an account representing a household), even though the IoT vendor offers operational and communication services through the IoT device(s) to support the high-level services.

To avoid the additional cost and complexity of managing the associations between unique device instances and accounts (e.g., accounts associated with households), some high-level service providers choose a model where each device is treated as a separate account. Some other high-level service providers consider multiple IoT devices from the same IoT vendor as a single household when being used by a single user. In such cases, the IoT vendors may not be aware of the deployment of these multiple devices. Despite the high-level service provider knowing the association between IoT devices and households, they may not share the knowledge with the IoT vendor due to business and/or privacy concerns, as the IoT vendor and the high-level service provider are typically separate entities.

BRIEF DESCRIPTION OF THE DRAWINGS

So that the present disclosure can be understood by those of ordinary skill in the art, a more detailed description may be had by reference to aspects of some illustrative embodiments, some of which are shown in the accompanying drawings.

FIG. 7 is a flowchart illustrating an authorization method for enabling the association of client devices to anonymized households, in accordance with some embodiments.

Figure 1:
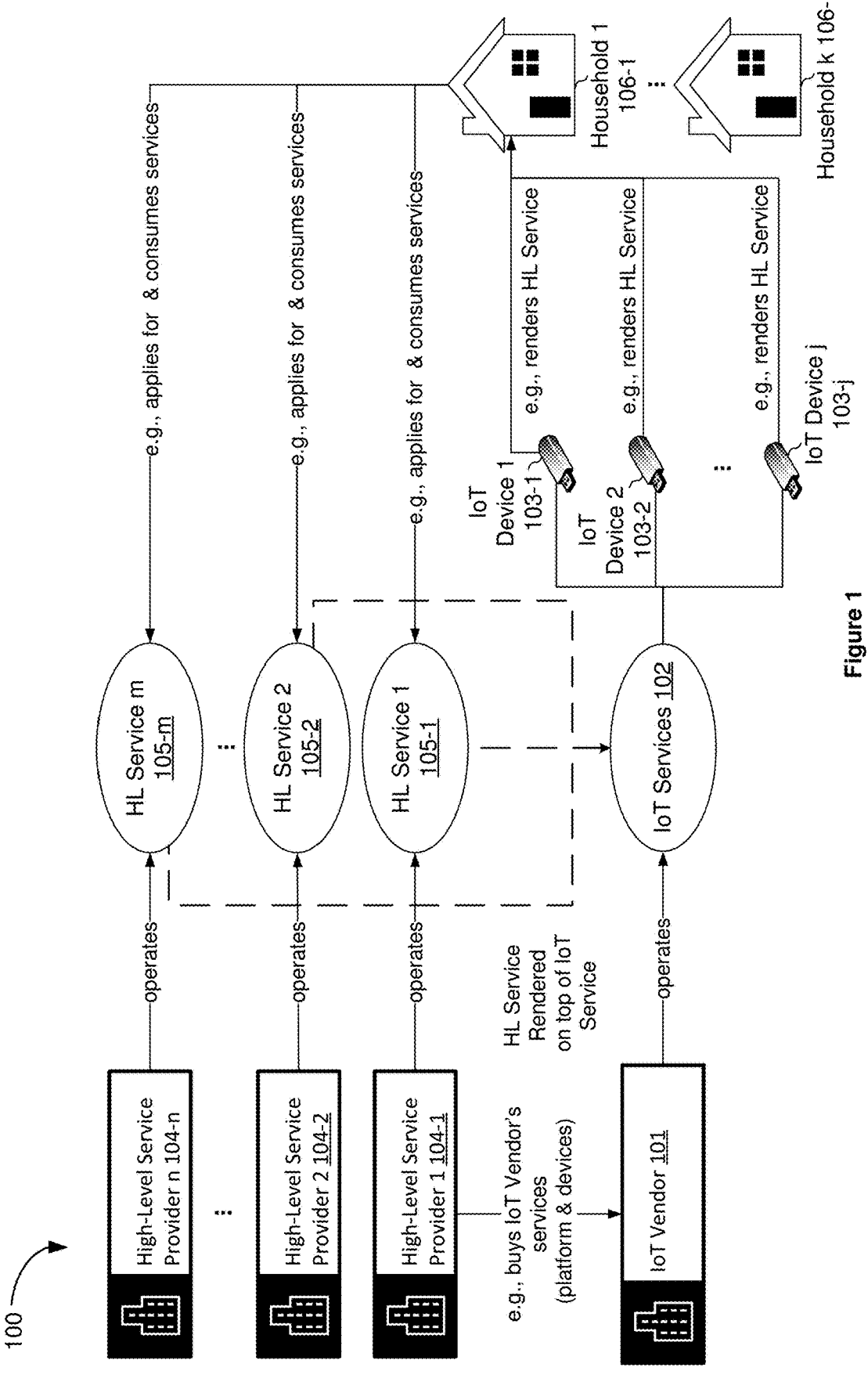
FIG. 1 is a block diagram of an exemplary service or multimedia content delivery system for delivering services or content to multiple households, in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DESCRIPTION OF EXAMPLE EMBODIMENTS

Numerous details are described in order to provide a thorough understanding of the example embodiments shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example embodiments described herein.

Overview

In accordance with some embodiments, methods, devices, and systems described herein allow Internet of Things (IoT) vendors to track the association of IoT devices to anonymized households by utilizing deployment-specific information to emulate a household identifier (ID). In some embodiments, an IoT device generates a deployment hash based on the credentials used for an IoT device to connect to the household network so it can connect to the IoT vendor's services, e.g., the WiFi service set identifier (SSID) and user-provided WiFi credential(s) during IoT device setup. The deployment hash serves as an approximate unique household ID and is sent to the IoT vendor as part of the device registration process in accordance with some embodiments. Additionally, in some embodiments, the IoT device also generates and sends an application hash that offers further insights into the devices within a household. For example, the application hash can be a hash of the WiFi access point media access control (MAC) address, and different application hash values associated with the same deployment hash value indicate the size of a household, e.g., the number of connections within the same household. The deployment hash and the application hash values are then stored and analyzed by the IoT vendor to provide information about the usage of deployed IoT devices such as the association of such IoT devices to households while maintaining user privacy.

In accordance with various embodiments, an authorization method for enabling the association of client devices to anonymized households is performed at a server that includes one or more processors and non-transitory memory. The method includes receiving a request for a service or content from a client device, wherein the request includes a device identifier corresponding to the client device, a first hash value approximating a unit in which the client device is deployed, and a second hash value representing a connection to the unit. The method also includes recording and evaluating the request based on the device identifier, the first hash value, and the second hash value. The method further includes generating an access token for the client device, binding the access token to the first hash value, and sending the access token to the client device for access to the service or content via the connection to the unit upon validating the request. The method additionally includes reporting an anomaly associated with one or more of the unit and the connection to the unit upon detecting the anomaly based on the device identifier, the first hash value, and the second hash value.

Example Embodiments

FIG. 1 is a diagram 100 illustrating an exemplary service or multimedia content delivery system in accordance with some embodiments. In some embodiments, Internet-of-Things (IoT) devices are deployed to facilitate the service and/or multimedia content delivery. The term IoT commonly refers to a network of physical objects or "things" embedded with sensors, instructions, and other technologies that enable them to connect and exchange data over the Internet or other communication networks. These objects can include every-day devices such as smartphones, home appliances, wear-able devices, vehicles, industrial machinery, and much more, e.g., thumb drive device 1 103-1, thumb drive device 2 103-2, . . . , thumb drive device j 103-j, etc. shown in FIG. 1, collectively referred to hereinafter as the IoT devices 103.

An IoT vendor 101 typically provides IoT devices and operates IoT services 102 on top of the IoT devices 103, e.g., running the IoT services as a platform, also referred to hereinafter as the platform services 102. Over the IoT services 102, certain high-level (HL) services provided by HL service providers (SPs) 104-1, 104-2, . . . , 104-n (collectively referred to hereinafter as the HL SPs 104) can be rendered, e.g., HL service 1 105-1, HL service 2 105-2, . . . , HL service m 105-m, etc., collectively referred to hereinafter as the high-level services 105 or HL services 105. In other words, the IoT vendor 101 provides the IoT devices 103 as well as the platform services 102 to support the HL services 105, and such platform services include, but not limited to, authentication, authorization, communica-tion, and/or operation capabilities as will be described in further detail below with reference to FIG. 3. In particular, among the IoT services 102, the communication capabilities allow the HL SPs 104 and/or the IoT vendor 101 to reach and control the IoT devices 103, which is necessary for render-ing the HL services 105 and performing ongoing mainte-nance of the IoT devices 103. In addition to the communi-cation capabilities, IoT authentication and authorization capabilities are also important, because they are used by the IoT vendor 101 to assure the identity of the users, the households 106, and/or the IoT devices 103. Further, the IoT vendor 101 also relies on authentication and authorization for secure communications with the IoT devices 103 and allow or deny access to the IoT services 102 and/or the HL services 105.

HL SPs 104 often contract with the IoT vendor 101 to use the IoT vendor's services 102 and devices 103 so that the HL services 105 can be rendered over the IoT vendor's service platform. For example, the HL SPs 104 operating various HL services 105 can offer the HL services 105 to households 106 for free, as one-time purchases or subscription-based services, e.g., offering the HL services 105 to household 1 106-1 or household k 106-k. By monitoring the traffic passing through the IoT services 102, the IoT vendor 101 can obtain data showing which HL SP 104 is rendering which HL service 105 on a particular IoT device 103 at a given time.

As used herein, a respective household 106 refers to a unit, e.g., a house, an office building, a mall, an apartment building, a warehouse, etc., where the IoT devices 103 are deployed and the IoT services 102 as well as the HL services 105 are receives. The household 106 is often associated with an account or a subscriber of the HL services 105 offered by the HL SPs 104, e.g., a private individual subscribing for an over-the-top (OTT) media service. As shown in FIG. 1, a user at a respective household 106 can apply for one or more HL services 105. To connect to the one or more HL services 105, the user receives and installs one or more IoT devices 103 on their premises, e.g., installing IoT devices 103-1 through 103-j on the premise of household 1 106-1. Along with the IoT devices 103, instructions, account information, and/or configurations required for local network connectiv-ity to communicate with the IoT services 102 are also provided to the user. Once a respective IoT device 103 is connected to the IoT services 102, the household account owner can then register and/or authenticate with a particular HL service 105 currently making use of the device 103.

The business scenario depicted in FIG. 1 applies to various IoT services 102, HL services 105, and households 106. For instance, the IoT vendor 101 can provide an IoT platform 102 for over-the-top (OTT) video streaming to residential or commercial buildings, with the IoT devices 103 capable of streaming video over IP and sending the streaming video to attached televisions (TVs) for display. Over such infrastructure, an OTT video service provider as the HL SP 104 offers video viewing applications as part of the HL service 105, through which residential or commercial users can select various channels and/or videos to watch. Such OTT video service 105 may be provided to the households 106 for a subscription fee, a one-time payment, or free of direct charges at the HL SP's discretion.

In another scenario, the IoT vendor 101 provides a remote video cameras platform as part of the IoT service 102, with remotely operated indoor and outdoor small video cameras as the IoT devices 103, thus offering the infrastructure for the HL services 105 such as motion detection and remote video capture. A security services operator as the HL SP 104 can then offer a home security service 105 that uses the IoT service platform 102 to monitor and respond to break-ins in private homes 106. Similarly, a retail optimization service provider as the HL SP 104 can use the same remote video cameras services 102 offered by the IoT vendor 101 to monitor customer traffic in large retail stores 106 and/or optimize shelf and aisle arrangements using insights gleaned from video feeds of in-store cameras 103.

As depicted in FIG. 1, several IoT devices 103 can be used in the same household, e.g., IoT devices 103-1 through 103-j used in household 1 106-1. The mapping between device identifiers (IDs) of the IoT devices 103 and unique house-holds 106 can be obfuscated or unknown to the IoT vendor 101, even though such information could be useful for business reasons. For example, the HL SP 104 may be oblivious to the mappings between device IDs of the IoT devices 103 and the actual households 106, especially when the HL service 105 is provided for free or for a one-time payment. In such cases, the HL SP 104 may model each IoT device 103 as a unique "virtual" household from the per-spective of the HL service 105.

In some other cases, the HL SP 104 may be aware of the associations. For instance, the HL SP 104 may have a registration process where the owner of the household 106 provides the identity of the IoT device 103 (e.g., a serial number) and submits the information obtained during the registration process. Using such information, the HL SP 104 can record the associations such as a particular IoT device 103 was sent to a particular household 106 for obtaining a particular HL service 105. In these scenarios, even though the HL SP 104 has the association information, they have no incentive to share the mappings between the device IDs of the IoT devices 103 and the unique households 106 with an outsider, i.e., the IoT vendor 101.

Regardless of the knowledge level of the HL SP 104, the IoT vendor 101 often does not have the deployment information of IoT devices 103 at various households 106, even though such information (or an approximation of such information) is useful for the IoT vendor 101 and/or the HL SP 104. As will be described in further detail below, the mappings can be useful for billing and/or for helping the HL SP 104 better understand how their services 105 are used by customers within each household 106. As also will be described in further detail below, the mappings are also useful for security reasons, such as identifying anomalies when the same device 103 is used by different households 106 within a short period of time.

Figure 2:
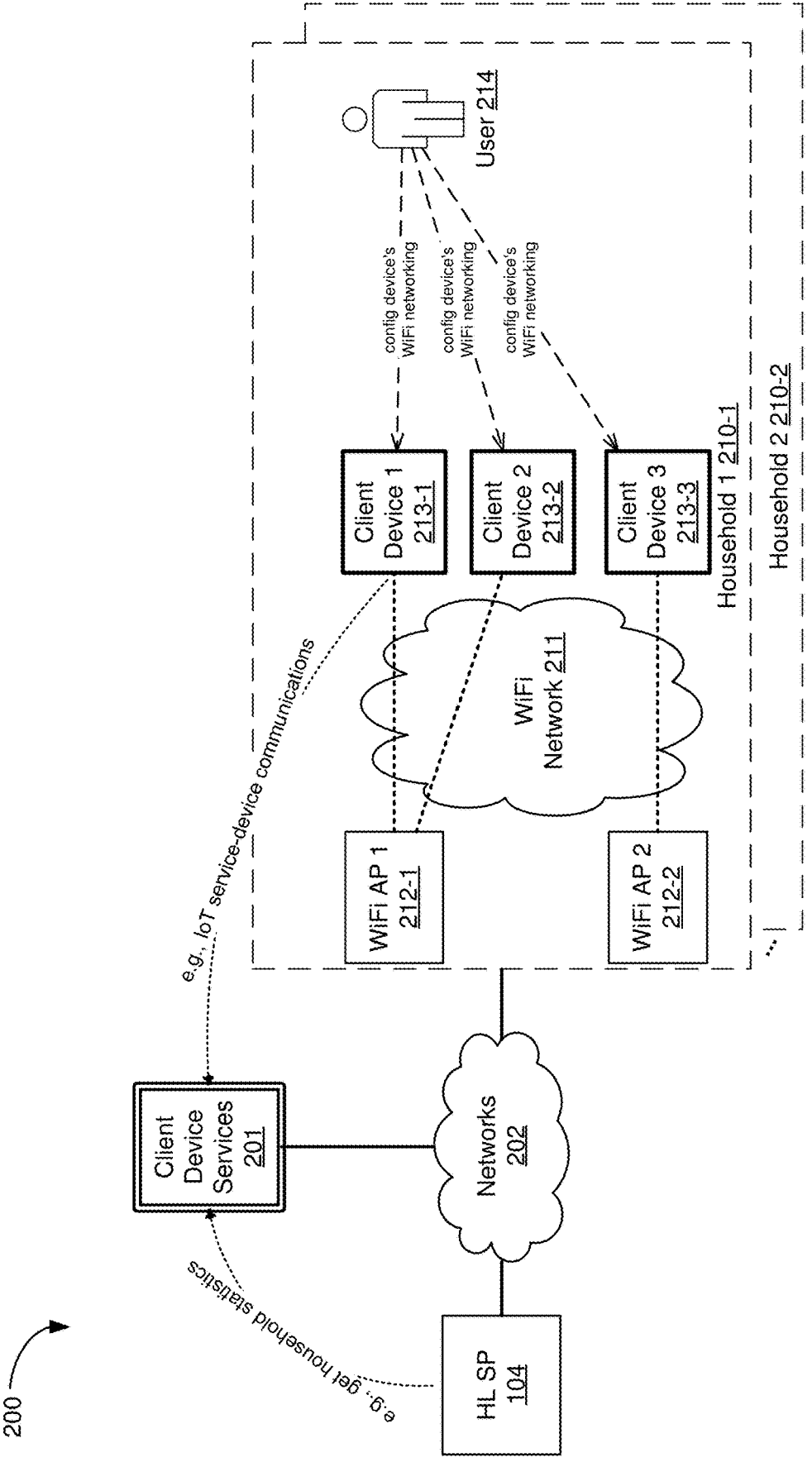
FIG. 2 is a diagram illustrating the deployment of client devices to households in the exemplary service or multiple content delivery system, in accordance with some embodiments.

FIG. 2 is a diagram 200 illustrating the deployment of client devices for HL services in accordance with some embodiments. In some instances, the IoT vendor 101 (FIG. 1) operates client device services 201, e.g., the IoT services 102 (FIG. 1), controls and manage the IoT devices 103 (FIG. 1). Multiple client devices 213, for instance, client device 1 213-1, client device 2 213-2, . . . , client device 3 213-3, are installed in household 1 210-1, and similar client devices 213 can be deployed in additional households 210, such as household 2 210-2. These client devices 213 encompass a variety of devices, including a set-top-box (STB) in the form factor of a thumb drive as shown in FIG. 1, an IoT device (e.g., the IoT device 103, FIG. 1), a camera, a smart appliance, a vehicle, and/or other computing devices. In some embodiments, the households 210 connect to the client device services 210 and/or the HL SP 104 through networks 202 (e.g., the Internet). To access the network 202, the client devices 213 are connected to a subnetwork within the household 210, e.g., a WiFi network or a wired network within the household 210. For example, the household 210 can one or more WiFi access points 212 providing a WiFi network 211 to connect to the networks 202, e.g., WiFi access point 1 212-1 and WiFi access point 2 212-2. These WiFi access points 212 enable the client devices 213 to communicate with the client device services 210 and/or the HL SP 104 using WiFi applications, the WiFi network 211, and the networks 202.

To connect to the WiFi network 211, in some embodiments, the client devices 213 are configured by a user 214, e.g., an installer and/or the household account owner. To configure WiFi connections, the user 214 enters the WiFi network service set identifier (SSID) and access credentials such as a password. The pair of (SSID, credentials) is typically different for different households 210. In certain scenarios, when the physical space of the household 210 is large (e.g., a large apartment complex, a warehouse, or an office building) and requires multiple WiFi access points 212 to ensure sufficient WiFi coverage for the client devices 213 located within, WiFi extenders or connectors may be used. Even in such scenarios, the same (SSID, credentials) pair is often used for the multiple WiFi access points 212 within a household 210. This approach allows for smooth handovers when WiFi endpoints move within the physical space, such as moving the client devices 213 from one room to another or from one floor to another in a building.

In some embodiments, since the client devices 213 within the same household 210 are provisioned with the same (SSID, credentials) tuple, this tuple is used as the basis for approximating a household, resulting in what is referred to hereinafter as a pseudo-household. The pseudo-household thus represents an assumed or approximated household with which one or more client devices 210 are associated in accordance with some embodiments, and the terms pseudo-household, anonymized household, and household are used interchangeably hereinafter to represent a unit such as a house, a building, etc. in which the client device(s) 210 are deployed. In addition to the SSID, each WiFi access point 212 is uniquely identifiable by its basic service set identifier (BSSID), which corresponds to the media access control (MAC) address of the access point or wireless router used for WiFi connection.

The unique MAC address is usually assigned to a network interface controller (e.g., the network interface) on the respective WiFi access point 212, enabling it to provide wireless network access services to the client devices 213 over the WiFi network 211. Consequently, the BSSID represents an association with a facet or property of the household 210, as there may be several BSSIDs within a given household 210. These BSSIDs can thus identify the associations of the client devices 213 with the household 210, as client devices 213 connected to different WiFi access points 212 within the same pseudo-household would observe different BSSIDs. Since multiple WiFi access points 212 are usually deployed in a household 210 to expand the WiFi coverage (e.g., on different floors or in different rooms), the number of BSSIDs within a pseudo-household can serve as an approximation of the physical size of the household 210.

In some embodiments, during the initial deployment configuration, the client devices 210 generate hashed representations of both the (SSID, credentials) tuple and the BSSID they observe. In some embodiments, the client device services 210 then use the hashed information to track the associations between the client devices 213 and the pseudo-household, as well as estimate the size of the pseudo-household for business and/or operational purposes. Using hashed values allows the IoT vendor operating the client device services 210 to track the associations of client devices 213 while preserving the anonymity of the households 210. In some embodiments, the association information is then reported to the HL SP 104 through a reporting interface, as will be described in further detail below.

It should be noted that although FIG. 2 illustrates using the (SSID, credentials) tuple for generating one hash value associated with the pseudo-household and using BSSID for generating another hash value associated with a property or facet of the pseudo-household, other information can be used for generating the hash values in accordance with various embodiments. For example, a default IP gateway MAC address identifying the household's broadband router and the credentials for configuring the gateway can be used for generating the hash value associated with the pseudo-household; and the network interface address or ID of the client device for connecting to the gateway can be used for generating another hash value associated with a property or facet of the pseudo-household. Other information for generating the hash value associated with the pseudo-household includes GPS coordinates or a mall ID associated with a remote video camera, regional climate data, and/or a unique landmark for a neighborhood, a display device identifier, and/or a broadcast identifier, a camera ID and/or display device interface information. Such information is expected to be statistically different for each household at a particular time of deployment and thus can be used to uniquely represents each pseudo-household. It should also be noted that although hash values are used as representations of pseudo-households and properties or facets of the pseudo-households for security, confidentiality, integrity, and authenticity, other cryptographic and security techniques and physical and/or virtual devices can be used in combination with or in place of hash values.

Figure 3:
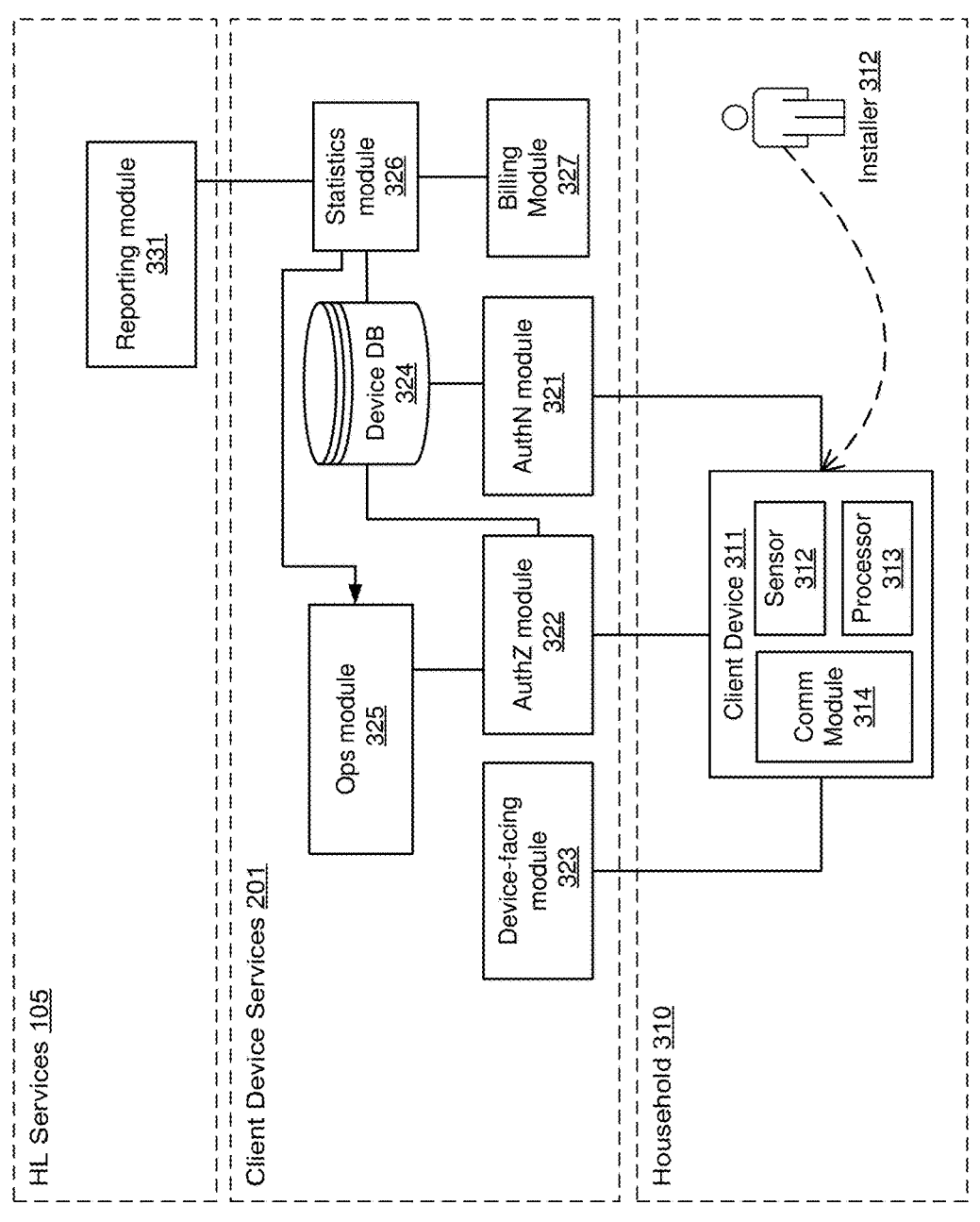
FIG. 3 is a diagram illustrating subcomponents in the exemplary service or multimedia content delivery system for associating deployed client devices to pseudo-households, in accordance with some embodiments.

FIG. 3 is a diagram 300 illustrating components within the settings depicted in FIGS. 1 and 2, in accordance with some embodiments. In some embodiments, an exemplary household 310 includes one or more client devices 311. Examples of the client devices 311 include the client device(s) 213 as described above with reference to FIG. 2 and/or the IoT device(s) 103 as described above with reference to FIG. 1. In some embodiments, the client device 311 comprises a communication module 314 for connecting to the HL services 105 via the client device services 201, e.g., a WiFi card and/or a network interface. Furthermore, in some embodiments, the client device 311 includes one or more sensors 312 and one or more processors 313 alongside the communication module 314. The communication module 314, the one or more sensor(s) 312, and the one or more processor(s) 313, collaborate to obtain deployment conditions of the client device 311, generate hash values based on these deployment conditions, and provide the hash values to the client device services 201 in accordance with some embodiments. During the deployment, as described above with reference to FIG. 2, in certain embodiments, an installer 312 (e.g., the user 214 in FIG. 2) provisions the client device 311 and configures the components of the client device 311, e.g., selecting and/or setting WiFi SSID and credentials. The provisioning allows the client device 311 to connect to the network in the household 310, e.g., connecting to the WiFi network 211 (FIG. 2) or connecting to a gateway device, and establish a connection to the client device services 210 over the networks outside the household 310, e.g., the networks 202 (FIG. 2).

In some embodiments, the client device services 201, operated by an IoT vendor (e.g., the IoT vendor 101, FIG. 1), include an authentication module 321 responsible for authenticating the client identity, and an authorization module 322 for granting authorized access to other resources provided by a device-facing module 323. The authentication module 321 ascertains that the user at the client device 311 is who they claim to be, and the authorization module 322 allows the client device 311 to access a particular piece of information provided by the client device services 201, e.g., data and/or services provided by the client device services 201 and/or the HL services 105.

In some embodiments, the client device services 201 also include a device database 324, which is coupled with the authorization module 322, serving as a repository for storing information associated with the client device 311. Additionally, in some embodiments, the client device services 201 include an operations module 325, coupled with the authorization module 322, for monitoring abnormal authorization flows, establish thresholds for abnormal conditions, and so forth. In some embodiments, the client device services 201 further include a statistics module 326 coupled with the operations module 325 and the device database 324 for generating statistics on pseudo-households for internal use (e.g., used by a billing module 327 and the operations module 325) and/or external use (e.g., used by a reporting module 331). In some embodiments, the billing module 327 uses pseudo-household statistics provided by the statistics module 326 to generate billing statements that take into account the number of pseudo-households. In some embodiments, the billing module 327 also uses pseudo-household statistics to audit the HL SP billing claims for a certain number of the households 310.

In some embodiments, the HL services 105 include a reporting module 331 for receiving data from the statistics module 326 and providing the HL SP with business insights. Such business insights include the average number of client devices 311 per pseudo-household, the average number of WiFi access point per pseudo-household, and/or reports of device IDs associated with the largest pseudo-households, etc.

It should be noted that components in the exemplary client device services 201 and/or the client device 311 can include more, less, and/or different elements than shown in FIG. 3. Further, each of the elements in the exemplary system 300 can include more, less, and/or different sub-elements than shown in FIG. 3. For example, the client device 311 can include a non-transitory memory for storing the credentials (e.g., passwords, fingerprint ID, etc.) and/or network configurations, such as WiFi SSID or BSSID, etc. In another example, the client device 311 can include a hash calculation module for generating hash values based on the (SSID, credentials) tuple and/or the BSSID. Alternatively, the processor 313 and/or the communication module 314 can include the hash calculation module as a sub-element. It should also be noted that each of the elements in the exemplary system 300 can include appropriate hardware, software, and/or firmware, to perform the operations attributed to the element herein. Operation(s) attributed to an element in the exemplary system 300 herein should not be considered binding and in some embodiments, other element(s) in the exemplary system 300 may additionally or alternatively perform such operation(s).

Figure 4:
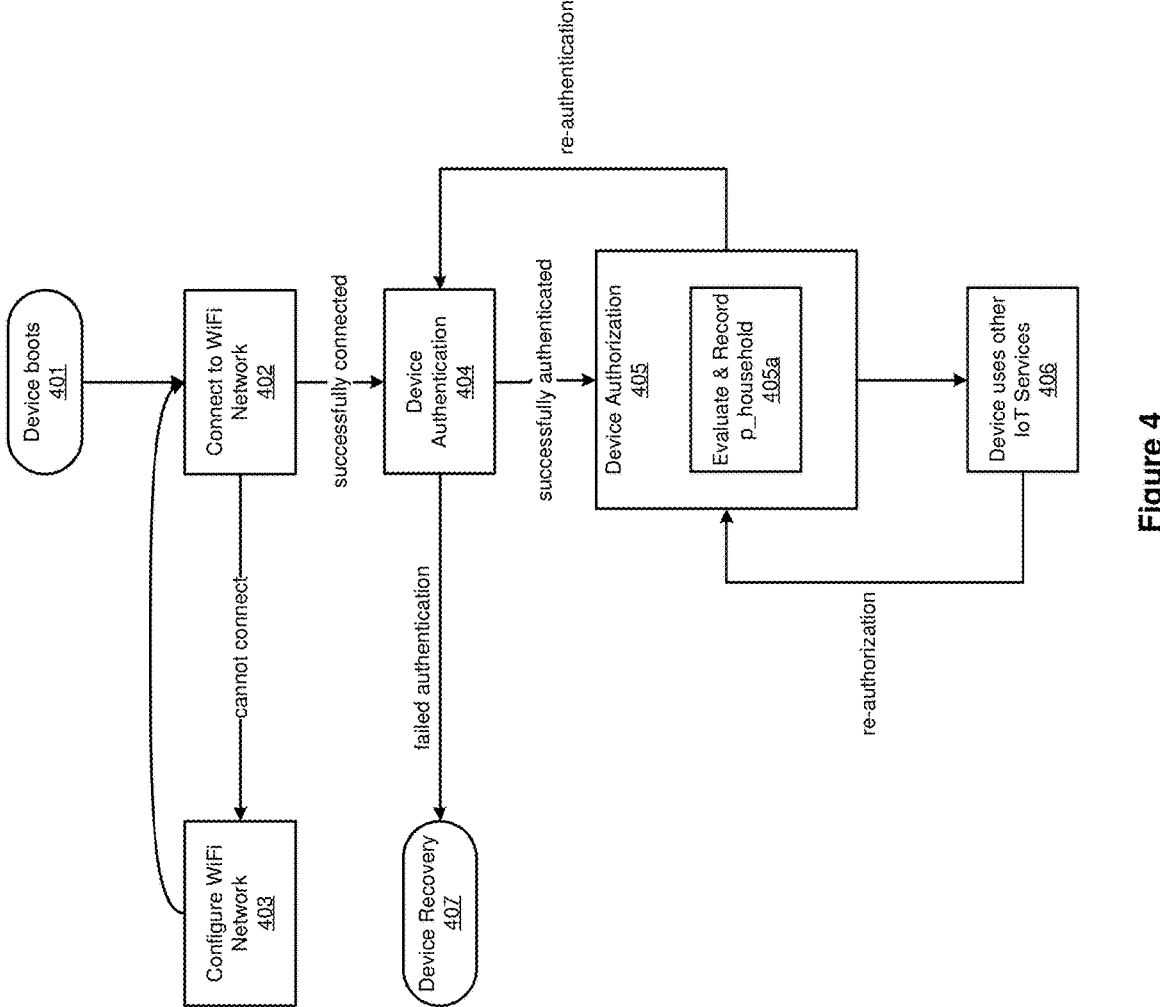
FIG. 4 is a flowchart illustrating authentication and authorization in the exemplary service or multiple content delivery system, in accordance with some embodiments.
Figure 4:

FIG. 4 is a flowchart 400 illustrating authentication and authorization of client devices for services and content in accordance with some embodiments. In some embodiments, the process starts with the client device (e.g., the client device 311, FIG. 3) booting up in step 401 in order to connect the client device to a network within a household in step 402, e.g., connecting to a WiFi network in a household. An installer (e.g., the installer 312, FIG. 3) provides the configuration information as inputs to the client device, e.g., the (SSID, credentials) tuple for connecting to the WiFi network or connecting configuration to an on-premise gateway device. In the case of a failed connection to the WiFi network, e.g., the WiFi connectivity configuration (SSID, credentials) is missing or not matching the current WiFi connectivity configuration, the client device proceeds to step 403, e.g., re-configuring the connection to the network. In the case of a successful connection to the network, the client device is authenticated in step 404, e.g., validating the (SSID, credentials) tuple by the authentication module 321 (FIG. 3).

Upon successful authentication, the client device is in possession of an identity assertion object received from the authentication module in accordance with some embodiments, and the identity assertion object will be used by the authorization module in the authorization step 405. In the case of failed authentication, the process proceeds to step 407 for device recovery. In some embodiments, the identity assertion object is a signed token or an assertion object. Subsequent requests to a server (e.g., the client device services 201, FIGS. 2 and 3) are accompanied by the signed token or the assertion object for verification. As used herein, an assertion object (also referred to as "an assertion" or "a client assertion") is a package of information that facilitates the sharing of identity and security information across different security domains.

In step 405, the client device is authorized (e.g., by the authorization module 322, FIG. 3) and upon successful authorization, the client device is in possession of an access token received from the authorization module and the access token can be used by the client device to access other client device services such as the services provided by the device-facing module 323 (FIG. 3) in step 406. Moreover, as part of the authorization process, in some embodiments, the authorization module evaluates and records pseudo-household information and the associations to pseudo-households in step 405a, so that the records can be analyzed and reported for billing, security, operational, and/or business insights purposes. The authorization process performed in step 405 is described in further detail below with reference to FIG. 5.

As used herein, an access token (also referred to hereinafter as "an authorization token") carries information from the authentication stage to the resource access stage. In some embodiments, the assertion object obtained during the authentication stage is used as part of an open standard for access delegation (e.g., OAUTH) flow, in which a client requests an authorization token from an authorization server and provides in the request an authorization grant received from the entity that authenticated and/or approved the client identity. In such embodiments, the assertion is created by the entity that validated client information so that the authorization server can validate the client when the client signs in; whereas in some embodiments, the access token is used by the client device when accessing resources and services as well as when requesting from the authorization module to refresh an expired authorization token, e.g., re-authorizing when the device uses other IT services in step 406.

Figure 5:
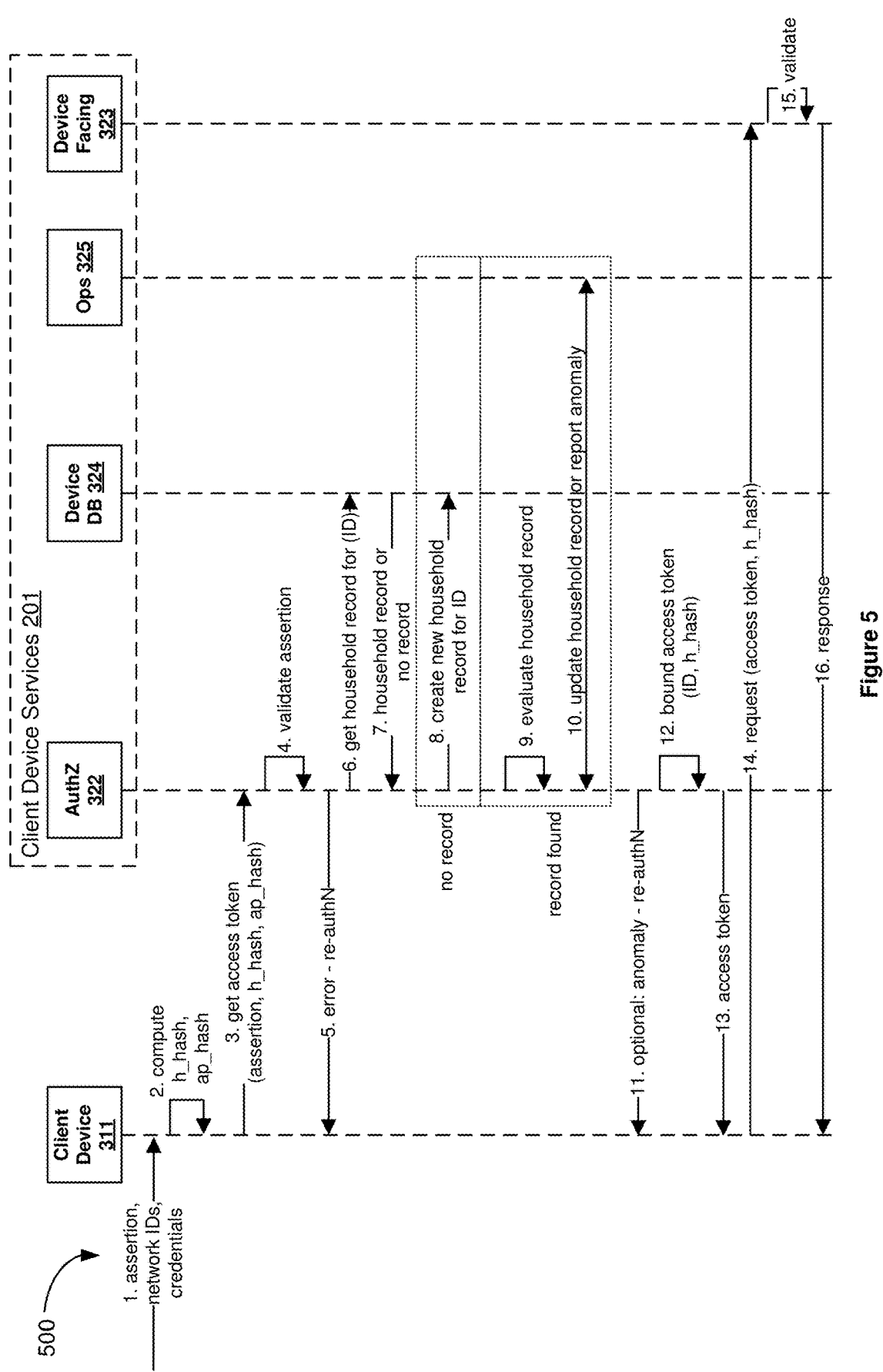
FIG. 5 is a sequence diagram illustrating associating client devices to pseudo-households during the authorization process, in accordance with some embodiments.

FIG. 5 is a sequence diagram 500 illustrating the authorization process in step 405 (FIG. 4) in accordance with some embodiments. In step 1, the client device 311 receives from the authentication module 321 (FIG. 3) an identity assertion object as the result of successful authentication, where the identity assertion object includes the authenticated device ID in accordance with some embodiments. In addition, upon successful network configuration, e.g., in step 402 and/or step 403 of FIG. 4, in some embodiments, the client device 311 also obtains the network IDs and/or the credentials for connecting to the network, e.g., the installer configures the SSID and credentials and the client device 311 locally stores the (SSID, credentials) tuple. Further, in some embodiments, upon connecting to the network, the client device 311 observes a facet or property of the network connection, e.g., the BSSID of the WiFi access point the client device 311 is connected through.

In step 2, the client device 311 (e.g., the processor 313 and/or the communication module 314) creates one-way hashed representations, e.g., using secure cryptographic functions such as Secure Hash Algorithm (SHA), etc. In some embodiments, the hash representations include a first hash value approximating a household. For example, in the case of using a WiFi connection to connect the client device 311 to a household, the first hash value can be calculated based on the (SSID, credentials) tuple, e.g., h_hash=F(SSID, credentials). In some embodiments, the hash representations include a second hash value representing an association to a facet or a property of the household. Continuing the example of using the WiFi connection to connect the client device 311 to the household, the second hash value can be calculated based on the BSSID, e.g., ap_hash=F(BSSID). In some embodiments, the hash values are packaged as compact strings for communication to the client device services 201, e.g., using BaseURL encode on the hashed values and stripping paddings, etc.

In step 3, the client device 311 sends the packaged hash values along with the identity assertion object to the authorization module 322 to request an access token authorizing the usage of various client device services functions in accordance with some embodiments. For example, following the OAUTH flow, the client device 311 can send the identity assertion object along with h_hash and ap_hash to request an access token from the authorization module 322, e.g., including in the request the identity assertion object and the first hash value h_hash and the second hash value ap_hash as two additional HTTP request headers.

In step 4, the authorization module 322 validates the identity assertion object, e.g., whether it is correctly formatted, has not expired, and/or was generated by the authentication module, etc. For example, to request the authorization tokens, the client device 311 can present an authorization proof token along with the identity assertion object according to the OAUTH flow so that that the combination of the authorization proof token and the identity assertion object demonstrates the information presented by the client device 311 is indeed issued to client device 1 250-1 by the server and the identity assertion object is valid.

In step 5, in the case of the authorization module 322 determining that the identity assertion object is invalid, the authorization module 322 returns an error code to the client device 311 and instructs the client device 311 to re-authenticate, e.g., returning from step 405 to step 404 as shown in FIG. 4. In some embodiments, the authorization module 322 extracts the device ID from the identity assertion object so the device ID can be used in subsequent authorization steps. In step 6, in the case of determining that the identity assertion object is valid, the authorization module 322 uses the extracted device ID to query the device database 324 in order to obtain a household record corresponding to the device ID, e.g., obtaining p_household_record based on the device ID. In response, in step 7, the device database 324 returns the household record or indicates no record corresponding to the device ID is found.

In step 8, in the case of receiving a response from the device database 324 indicating no record was found, in some embodiments, the authorization module 322 creates a new household record and stores it in the device database 324. In some embodiments, the new household record includes the hash values received from the client device 311 in step 3. In some embodiments, the new household record also includes the current timestamp as well initial values of fields for facilitating subsequent billing and/or anomaly detection. In some embodiments, a household record, e.g., p_household_record, includes the information obtained by the client device services 201 for a particular client device 311 and such information is related to the association of the client device 311 to the pseudo-household.

For instance, the household record can be a database record, such as a row in a table with fields such as device ID (e.g., device_id as the key of the table), last recorded hash value of the (SSID, credentials) tuple (e.g., h_hash string possibly used for indexing), number of times the h_hash value has changed after the initialization (e.g., h_hash_chng_ctr as a numerical value with an initial value of 0 for the device ID), timestamp of the last h_hash update (e.g., h_hash_last_change_ts in seconds since Jan. 1, 1970, 00:00), delta in seconds between the previous h_hash update event and the current update (e.g., h_hash_last_change_dt with an initial value of 0 for the device ID), average of h_hash value change delta in seconds (e.g., h_hash_average_change_dt), last recorded hash value of BSSID (e.g., ap_hash string possibly used for indexing), number of times the ap_hash value has changed after the initialization (e.g., ap_hash_chng_ctr with an initial value of 0), timestamp of the last ap_hash update (e.g., ap_hash_last_change_ts in seconds since Jan. 1, 1970, 00:00), delta in seconds between the previous ap_hash update event and the current update (e.g., ap_hash_last_change_dt in seconds with an initial value of 0 for the device ID), and/or average of ap_hash value change delta in seconds (e.g., ap_hash_average_change_dt), etc. In some embodiments, summary statistical fields are computed as records in the table, and such records are created and updated for improved performance, e.g., to avoid complex and performance impacting queries during the latency-sensitive authorization process as well as to avoid a potentially large increase in the size of the device database 324.

In some embodiments, during the initialization of the device database 324, information for each of the client device 311 is pre-populated, e.g., records representing client devices 324 that have not been connected to the client device services 201 are set to null for hash value fields and/or 0 for numerical fields, etc. When the first time a client device 311 is connected to the client device services 201 and sends the computed first and second hash values to the client device services 201, a new p_household_record is created and populated with information such as the device ID, the h_hash and ap_hash values, as well as the current timestamp for fields such as h_hash_last_change_ts and ap_hash_last_change_ts.

Still referring to FIG. 5, in the case of receiving a response from the device database 324 indicating a record was found, in step 9, the authorization module 322 evaluates the household record, such as by comparing h_hash and ap_hash_device values for the device ID in the located p_household_record against the h_hash and ap_hash values received from the client 311. Depending on the evaluation result, in step 10, the authorization module 322 updates the p_household record in the device database 324 in the case of the evaluation result showing the the first and second hash values received from the client device 311 match those in the p_household record from the device database 324. Alternatively, in step 10, the authorization module 322 determines whether the changes indicate any anomaly in the case of the evaluation result showing the first and second hash values received from the client device 311 do not match those in the p_household record and reports to the operation module 325 of the anomaly. In some embodiments, the authorization module 322 further determines whether an anomaly handling policy requires re-authentication in the case of detecting anomaly, and returns an error to the client device 311 to instruct the client device 311 to perform re-authentication in the case of the anomaly handling policy requires re-authentication in step 11.

In step 12, upon successful authorization, the authorization module 322 prepares to grant access to the client device 311. In some embodiments, to grant access to the client device 311, the authorization module 322 generates an access token bounded to the first hash value and sends the access token to the client device 311 in step 13. In some embodiments, when the client device 311 requests resources and/or services from the device facing module 323 in step 14, the device facing module 323 receives both the access token and the first hash value from the client device 311.

Using the bounded information, the device facing module 323 validates the access token in step 15, e.g., by determining that the access token is used by a client device in the same pseudo-household, and sends a response in step 16 upon successful validation. In some embodiments, the device facing module 323 also validates that the access token is valid and has not expired. Various validations are described in further detail below with reference to FIGS. 6A and 6B. In some embodiments, if any validation fails, the device facing module 323 returns an error to the client device 311, e.g., indicating that re-authorization is required. It should be noted that the second hash value, e.g., the ap_hash value calculated based on BSSID, is not provided by the client device 311 nor expected by the device facing module 323 in step 14. Since changes to facets or properties of the household are expected, e.g., changing BSSID values reflecting the client device 311 moving around in a building and connecting to different WiFi access points, not requiring re-authorization when the second hash value changes avoids excessive usages of the device DB 324.

Various methods can be used to bind the access token generated for the client device 311 to the first hash value. For example, the authorization module 322 can include the first hash value received from get access token request in step 3 as a field in the access token, so that the device facing module 323 can validate the access token as well as the binding in step 15 by comparing the first hash value received in step 14 with the field in the access token. In another example, for enhanced security, instead of including the first hash value in the access token, the authorization module 322 derives a value from the first hash value and a secret key known only to the client device services 201 and includes the derived value in the access token. Both of these methods allow the device facing module 323 to validate the binding without accessing a database, thus supporting stateless rapid processing at the device facing module 323. In the second method, the first hash value is protected since the access token does not have an visible indication as to which hash value it is bound to. In some embodiments, the authorization module 322 stores in a token database (e.g., as part of the device database 324 or in a separate database) a mapping between a respective first hash value and a respective access token generated for a particular device ID. Because the mappings are stored on the server side, this third method also provides enhanced security as the second method described above, but it requires accessing a database by the device facing module 323 whenever validating an access token.

Figures 6A, 6B:
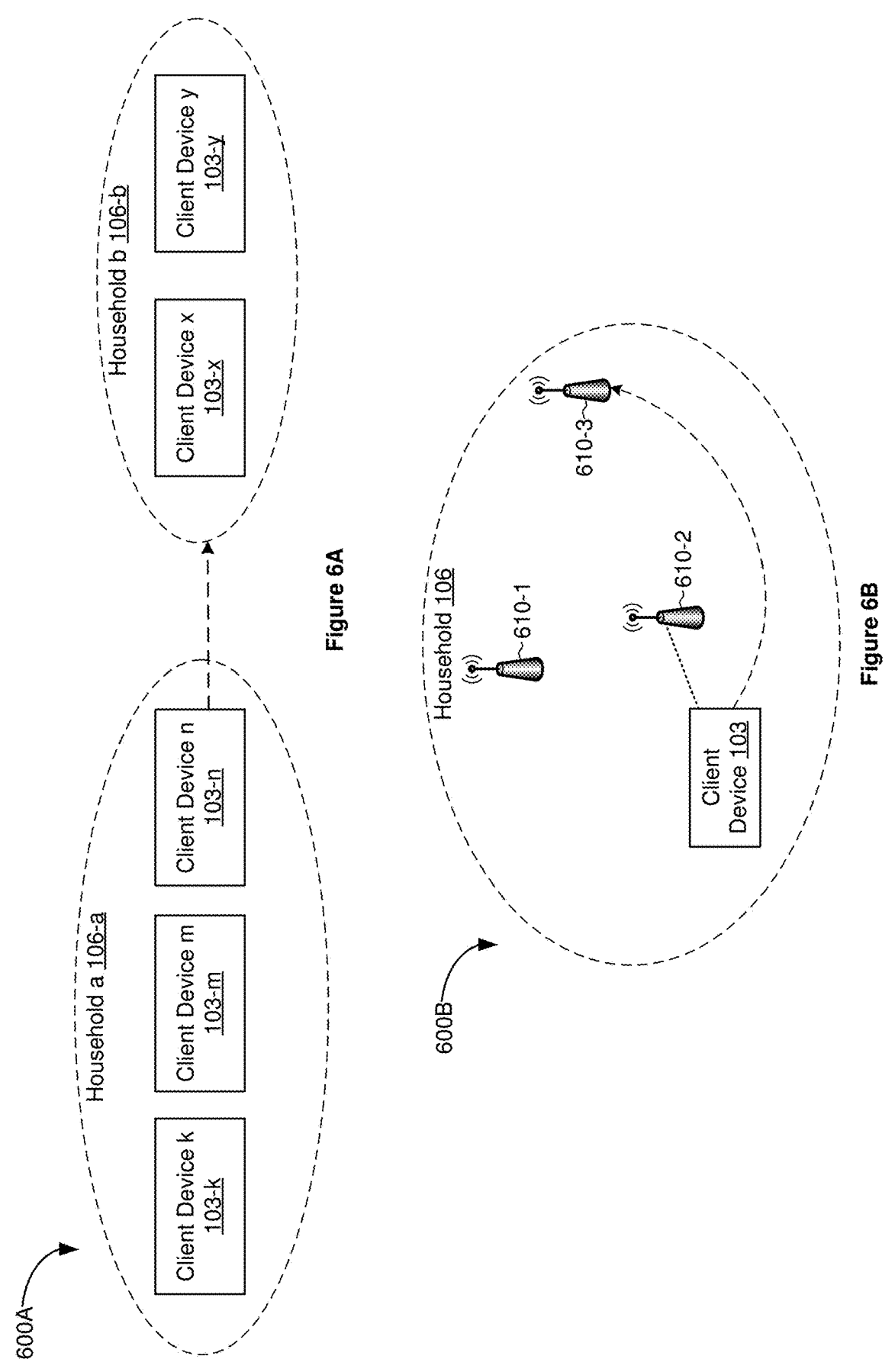
FIGS. 6A and 6B are diagrams illustrating change analysis and anomaly determination in the service or multiple content delivery system, in accordance with some embodiments.

FIGS. 6A and 6B are diagrams 600A and 600B illustrating changes analysis and anomaly determination in accordance with some embodiments. Using the data stored in the device database 324 (FIGS. 3 and 5), changes to the first and second hash values are recorded for a respective client device. As such, changes in a respective p_household record may be due to normal and expected conditions, or may indicate an abnormal case. For instance, as described above, the h_hash value can represents the (SSID, credentials) tuple for a client device to be connected to a WiFi network in a household. In such cases, normal changes can be triggered by the household owner changing the home WiFi network setup, e.g., changing the SSID and/or the credentials. In another example, as shown in FIG. 6A, initially client devices k, m, and n 311-k, 311-m, and 311-n are deployed in household a 106-a and client devices x and y 311-x and 103-y are deployed in household b 311-b. Normal changes can also be triggered when the household owner of household a 106-a moves client device n 311-n to another household, e.g., to household b 106-*b*. Following initial installation and/or deployment, with possibly the installer testing different networks in different households, such changes are expected to be rare, and far apart in time. As such, many changes and/or relatively frequent changes may indicate issues with the authentication process described above with reference to FIGS. 4 and 5.

As describe above, in the case of using a WiFi network in a household, the second hash value, e.g., ap_hash value, can be derived from the BSSID, e.g., the physical MAC address of the WiFi access point that the client device connects to. In FIG. 6B, the household 106 has multiple WiFi access points 610-1, 610-2, and 610-3, collectively referred to hereinafter as the WiFi access points 610. Initially, the client device 103 is connected to WiFi access point 610-2. The client device 103 can connect to a different WiFi access point 610 when the WiFi access point 610-2 is out of reach, WiFi access point 610-2 being powered down, an intermittent reception issue, and/or or the client device 311 rebooted and elected to use a different WiFi access point 610-3. For the household 106 with multiple WiFi access points 610, such changes can be frequent and are considered benign. Accordingly, relatively frequent changes to the second hash values, e.g., ap_hash values, do not indicate anomaly. However, in the case of the second hash values having exceedingly frequent changes, e.g., as compared to the normal population, the anomaly indicates issues with the client device 311, e.g., hardware and/or firmware issues. In some embodiments, when the household owner decides to change the WiFi network setup of the household 106, e.g., changing the SSID and/or the credentials, and/or moves the client device 311 to another household, such changes also trigger changes to the second hash value. As described above with reference to FIG. 6A, such changes are relatively infrequent.

In some embodiments, to determine whether a change is abnormal for the first and second hash values, the authorization module 322 (FIGS. 3 and 5) evaluates fields in the p_hsouehold record with the corresponding client device ID. For example, the authorization module can evaluate the number of times the hash value has changed, e.g., evaluating h_hash_chng_ctr field and/or ap_hash_chng_ctr field. In another example, the authorization module can evaluate the average time between changes, e.g., evaluating h_hash_average_change_dt field and/or ap_hash_average_change_dt field. In some embodiments, for anomaly determination, the authorization module evaluates the number of times the hash value has changed and/or the average time between changes. For example, in the case of the number of changes to the h_hash value exceeding a first threshold, e.g., indicating a client device with an unusually high number of changes to the (SSID, credentials) tuple, the authorization module reports the abnormal status to the operation module 325 (FIGS. 3 and 5). In another example, in the case of the number of changes to the h_hash value exceeding a second threshold and the average time between changes is less than a third threshold, e.g., indicating a client device with frequent changes to the (SSID, credentials) tuple within a short duration, the authorization module reports the abnormal status. The same methods are used for evaluating the second hash value in accordance with various embodiments and are not described herein for the sake of brevity sake.

In some embodiments, the thresholds for determining the abnormal behaviors are set statically, e.g., setting the first threshold to 100, the second threshold to 50, and the third threshold to 24 hours, etc. In some other embodiments, the thresholds are configured based on the data analysis of the records in the device DB 324 (FIGS. 3 and 5), e.g., setting the first threshold to be 5 standard deviations higher than the average change counter. Further, In some embodiments, in addition to reporting abnormal client device behaviors, the authorization module uses anomaly handling policies for determining whether to grant access to client devices or require re-authentication. In some embodiments, the policy is set separately for h_hash abnormalities and ap_hash abnormalities, e.g., one set of thresholds specified in one set of policies for measuring h_hash values and another set of thresholds specified in another set of policies for measuring ap_hash values. In addition, certain policies specify abnormal conditions that cause reporting to the operation module, while other policies specify abnormal conditions that require the client devices to re-authenticate, e.g., a first set of thresholds for measuring h_hash values and ap_hash values for reporting purposes and a second set of thresholds, different from the first set of thresholds, for measuring h_hash values and ap_hash values for re-authentication.

FIG. 7 is a flow chart illustrating an authorization method 700 for enabling the association of client devices to anonymized households in accordance with some embodiments. In some embodiments, as represented by block 710, the method 700 is performed at a server (e.g., one or more servers hosting the IoT services 102 in FIG. 1 and/or the client device services 201 in FIGS. 2-3 and 5) that includes one or more processors and non-transitory memory. The platform hosted by the server can provide the IoT services as described with reference to FIG. 1 and/or client device services as described with reference to FIGS. 2-3 and 5, such as OTT media content streaming services, security services, and/or remote camera services, etc.

As represented by block 720, the server receives a request for a service or content from a client device, e.g., the authorization module 322 of the client device services 201 receiving the get access token request in step 3 from the client device 311 such as an STB, a remove video camera, etc. In some embodiments, the request includes a device identifier corresponding to the client device (e.g., a device ID of a client device packaged in an assertion object), a first hash value (e.g., the h_hash value) approximating a unit (e.g., a house, a shopping mall, a building, a large apartment, etc.) in which the client device is deployed, and a second hash value (e.g., the ap_hash value) representing a connection of the client device to the unit. As such, the first hash value is associated with a pseudo-household, e.g., an anonymized household, and represents the identification information received from any device deployed in the unit; and the second hash value represents an association to a facet or a property of the unit.

For example, as shown in FIGS. 6A and 6B, the unit can be a household (e.g., the households 106*a*, 106*b*, and 106*c* in FIG. 6A and the household 106 in FIG. 6B) with one or more network access points (e.g., the WiFi access points 610-1, 610-2, and 610-3 in FIG. 6B). In such environment, the first hash value can be computed based on a tuple of an identifier associated with the one or more network access points and an access credential used by the client device to connect to the one or more network access points, e.g., computing the first hash value based on the <SSID, credentials> tuple. Also in such environment, the second hash value can be computed based on a unique identifier for the client device connecting to the one or more network access points, e.g., the BSSID.

Other information unique to deployment used for computing the first hash value can be a location, a network configuration, and/or environmental characteristics of the unit at time of deploying the client device, such as GPS coordinates or a mall ID associated with a remote video camera, regional climate data, and/or a unique landmark for a neighborhood, a display device identifier, a broadcast identifier, etc. For example, when a display device is connected to an audio/video interface, e.g., a High-Definition Multimedia Interface (HDMI), the display device provides Extended Display Identification Data (EDID) or Enhanced EDID (E-EDID) information over the audio/video interface to the client device. The EDID or the E-EDID information can be used by the client device for computing the first hash value. In still another example, in a radio environment, a broadcast identifier of the client device can be used for computing the first hash value. In another example, the Ethernet MAC address of the default gateway in the unit, e.g., a broadband router connecting a household to the Internet, can be used for computing the first hash value.

Still referring to FIG. 7, as represented by block 730, the server records and evaluates the request based on the device identifier, the first hash value, and the second hash value, e.g., evaluating and recording the p_household record in the device database 324 as represented in steps 6 through 10 in FIG. 5 and as represented by block 405a in FIG. 4. In some embodiments, the non-transitory memory of the server includes the device database or any other database for storing p_household records. When the authorization module does not locate an existing p_household record in the device database, in some embodiments, the server records and evaluates the request based on the device identifier, the first hash value, and the second hash value by creating a first record (e.g., a p_household record) in the database with a first set of fields corresponding to the device identifier (e.g, the device ID), the first hash value (e.g., the h_hash value), the second hash value (e.g., the ap_hash value), and timestamps. Further, the server initializes a second set of fields of the first record representing changes to the first record, e.g., initializing h_hash_chng_ctr, ap_hash_chng_ctr, h_hash_last_change_dt, ap_hash_last_change_dt, etc. On the other hand, when the authorization module locates an existing p_household record in the device database, the authorization module updates the device database with an updated p_household_record for the client device. As such, in some embodiments, when evaluating the request, the server locates a second record in the database corresponding to the device identifier, determines whether or not the first hash value and the second hash value match fields in the second record, and updates the second record in accordance with a determination of the first hash value or the second hash value not matching the fields in the second record.

Still referring to FIG. 7, as represented by block 740, the server generates an access token for the client device, binds the access token to the first hash value, and sends the access token to the client device for access to the service or content via the connection to the unit upon validating the request. In some embodiments, as shown in steps 14 through 16 of FIG. 5, when the server subsequently receives an access request for the service from the client device, where the access request includes the access token binding to the device identifier and the first hash value, the server authorizes the access request for the service base on the access token, the device identifier, and the first hash value. As such, in subsequent requests, the ap_hash value is not provided by the client device nor expected, and the access token is bound with a specific h_hash value, so that the authorization module receiving both from a client device would be able to determine that the access token is used by a client device in the same pseudo-household.

Method 700 continues with the server reporting an anomaly associated with one or more of the unit and the connection to the unit upon detecting the anomaly based on the device identifier, the first hash value, and the second hash value. In some embodiments, identifying the anomaly based on the changes includes identifying abnormal changes to the unit based on one or more of a number of changes and a frequency of changes to the first hash value, e.g., unusually high number of changes and/or frequent changes to the <SSID, credentials> tuple. In some embodiments, identifying the anomaly based on the changes includes identifying abnormal changes to the connection to the unit based on one or more of a number of changes and a frequency of changes to the second hash value, e.g., unusually high number of changes to BSSID and/or exceedingly frequent BSSID changes.

Though not shown in FIG. 7, in some embodiments, the method 700 further includes receiving multiple requests for authentication to the service from multiple client devices, wherein a respective one of the multiple requests includes a respective device identifier corresponding to a respective one of the multiple client device, a respective first hash value approximating a respective unit in which the respective client device is deployed, and a respective second hash value representing a respective connection within the respective unit; and deriving a size of the respective unit based on the respective device identifier, the respective first hash value, and the respective second hash value. As such, using the p_household records stored in the non-transitory memory, information for billing purposes, business insights, and/or operations can be obtained. For example, the number of pseudo-households can be obtained based on the unique h_hash values in the device database. In another example, business insights such as the average number of devices per pseudo-household, the size of a pseudo-household, average number of WiFi access points in each pseudo-household can be obtained based on the number of unique ap_hash values having the same h_hash value. Other business insights, such as the top number of pseudo-households that have the largest number of client devices and/or WiFi access points can also be obtained. In addition, for operation purposes such as setting the thresholds for anomaly detection, the minimum, maximum, average, median, and/or standard deviation of the change counters or change time of the hash values can be derived from the p_household records.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first device could be termed a second device, and, similarly, a second device could be termed a first device, which changing the meaning of the description, so long as all occurrences of the "first device" are renamed consistently and all occurrences of the "second device" are renamed consistently. The first device and the second device are both devices, but they are not the same device.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting", that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The invention claimed is:

1. A method comprising:
at a server including one or more processors and non-transitory memory:
receiving a request for a service or content from an Internet of Things (IoT) device deployed within a unit, wherein the request includes a device identifier corresponding to the IoT device, a first hash value approximating the unit, and a second hash value, different from the first hash value, representing a unique connection of the IoT device to the unit among a plurality of IoT devices deployed within the unit, and wherein the first hash is calculated based on a deployment-specific identifier (ID) of the unit shared by the plurality of IoT devices;
recording and evaluating the request based on the device identifier, the first hash value, and the second hash value;
generating an access token for the IoT device, binding the access token to the first hash value, and sending the access token to the IoT device for access to the service or content via the connection to the unit upon validating the request; and
reporting an anomaly associated with one or more of the unit and the connection to the unit upon detecting the anomaly based on the device identifier, the first hash value, and the second hash value.

2. The method of claim 1, wherein the unit is a household with one or more network access points connecting the plurality of IoT devices to the unit.

3. The method of claim 2, wherein:
the first hash value is computed based on a tuple of an identifier associated with the one or more network access points and an access credential used by the IoT device to connect to the one or more network access points.

4. The method of claim 3, wherein the second hash value is computed based on a unique identifier for the IoT device connecting to the one or more network access points.

5. The method of claim 1, wherein the first hash value is computed based on one or more a location, a network configuration, and environmental characteristics of the unit at time of deploying the IoT device.

6. The method of claim 1, wherein the non-transitory memory includes a database, and recording and evaluating the request based on the device identifier, the first hash value, and the second hash value include:
creating a first record in the database with a first set of fields corresponding to the device identifier, the first hash value, the second hash value, and timestamps; and
initializing a second set of fields of the first record representing changes to the first record.

7. The method of claim 6, wherein evaluating the request includes:
locating a second record in the database corresponding to the device identifier;
determining whether or not the first hash value and the second hash value match fields in the second record; and
updating the second record in accordance with a determination of the first hash value or the second hash value not matching the fields in the second record.

8. The method of claim 6, wherein:
detecting the anomaly includes identifying the anomaly based on the changes; and
reporting the anomaly includes forgoing sending the access token to the IoT device.

9. The method of claim 8, wherein identifying the anomaly based on the changes includes identifying abnormal changes to the unit based on one or more of a number of changes and a frequency of changes to the first hash value.

10. The method of claim 8, wherein identifying the anomaly based on the changes includes identifying abnormal changes to the connection to the unit based on one or more of a number of changes and a frequency of changes to the second hash value.

11. The method of claim 8, wherein identifying the anomaly based on the changes includes identifying a frequency of changes to the second hash value exceeding a second threshold indicating the abnormal changes to the connection to the unit.

12. The method of claim 1, further comprising:
receiving an access request for the service or content from the IoT device, wherein the access request includes the access token binding to the device identifier and the first hash value; and
authorizing the access request for the service or content base on the access token, the device identifier, and the first hash value.

13. The method of claim 1, further comprising:
receiving multiple requests for authentication to the service or content from the plurality of IoT devices, wherein a respective one of the multiple requests includes a respective device identifier corresponding to a respective plurality of IoT device, the first hash value, and a respective second hash value representing a respective connection within the unit; and
deriving a size of the unit based on the respective device identifier, first hash value, and the respective second hash value.

14. The method of claim 1, wherein the service or content includes one or more of over-the-top (OTT) video streaming services, security services, and remote camera services.

15. A server comprising:

one or more processors;

non-transitory memory; and one or more programs stored in the non-transitory memory, which, when executed by the one or more processors, cause the server to:

receive a request for a service or content from an Internet of Things (IoT) device deployed within a unit, wherein the request includes a device identifier corresponding to the IoT device, a first hash value approximating the unit, and a second hash value, different from the first hash value, representing a unique connection of the IoT device to the unit among a plurality of IoT devices deployed within the unit, and wherein the first hash is based on a deployment-specific identifier (ID) of the unit shared by the plurality of IoT devices;

record and evaluate the request based on the device identifier, the first hash value, and the second hash value;

generate an access token for the IoT device, bind the access token to the first hash value, and send the access token to the IoT device for access to the service or content via the connection to the unit upon validating the request; and report an anomaly associated with one or more of the unit and the connection to the unit upon detecting the anomaly based on the device identifier, the first hash value, and the second hash value.

16. The server of claim 15, wherein the unit is a household with one or more network access points connecting the plurality of IoT devices to the unit.

17. The server of claim 16, wherein:

the first hash value is computed based on a tuple of an identifier associated with the one or more network access points and an access credential used by the IoT device to connect to the one or more network access points.

18. The server of claim 17, wherein the second hash value is computed based on a unique identifier for the IoT device connecting to the one or more network access points.

19. The server of claim 15, wherein the first hash value is computed based on one or more a location, a network configuration, and environmental characteristics of the unit at time of deploying the IoT device.

20. A non-transitory memory storing one or more programs, which, when executed by a server, cause the server to:

receive a request for a service or content from an Internet of Things (IoT) device deployed within a unit, wherein the request includes a device identifier corresponding to the IoT device, a first hash value approximating the unit, and a second hash value, different from the first hash value, representing a unique connection of the IoT device to the unit among a plurality of IoT devices deployed within the unit, and wherein the first hash is calculated based on a deployment-specific identifier (ID) of the unit shared by the plurality of IoT devices;

record and evaluate the request based on the device identifier, the first hash value, and the second hash value;

generate an access token for the IoT device, bind the access token to the first hash value, and send the access token to the IoT device for access to the service or content via the connection to the unit upon validating the request; and report an anomaly associated with one or more of the unit and the connection to the unit upon detecting the anomaly based on the device identifier, the first hash value, and the second hash value.

\*  \*  \*  \*  \*